US011848610B2

(12) United States Patent
Chen (10) Patent No.: US 11,848,610 B2
(45) Date of Patent: Dec. 19, 2023

(54) LOW RIPPLE PULSE-SKIP MODE CONTROL IN SWITCHING MODE POWER SUPPLIES

(71) Applicant: Analog Devices, Inc., Wilmington, MA (US)

(72) Inventor: Hua Chen, Santa Clara, CA (US)

(73) Assignee: Analog Devices, Inc., Wilmington, MA (US)

( * ) Notice: Subject to any disclaimer, the term of this patent is extended or adjusted under 35 U.S.C. 154(b) by 58 days.

(21) Appl. No.: 17/393,103

(22) Filed: Aug. 3, 2021

(65) Prior Publication Data

US 2023/0038245 A1 Feb. 9, 2023

(51) Int. Cl.
| | | |
|---|---|---|
| *H02M 3/158* | (2006.01) | |
| *H02M 1/08* | (2006.01) | |
| *H02M 1/14* | (2006.01) | |
| *H02M 1/00* | (2006.01) | |

(52) U.S. Cl.
CPC ......... *H02M 3/158* (2013.01); *H02M 1/0009* (2021.05); *H02M 1/0035* (2021.05); *H02M 1/0041* (2021.05); *H02M 1/08* (2013.01); *H02M 1/14* (2013.01)

(58) Field of Classification Search
CPC .... H02M 3/158; H02M 3/1582; H02M 3/156; H02M 3/1563; H02M 3/157
See application file for complete search history.

(56) References Cited

U.S. PATENT DOCUMENTS

| | | |
|---|---|---|
| 5,912,552 A | 6/1999 | Tateishi |
| 7,026,795 B2 | 4/2006 | So |
| 7,161,333 B2 | 1/2007 | Soch et al. |
| 7,315,153 B2 | 1/2008 | Tazawa et al. |
| 7,446,517 B2 | 11/2008 | Chen et al. |
| 8,030,909 B2 | 10/2011 | Ma et al. |
| 8,710,816 B2 | 4/2014 | Miyazaki |
| 8,773,099 B2 | 7/2014 | Granger |
| 8,829,876 B2 | 9/2014 | Michishita et al. |
| 9,325,233 B2 | 4/2016 | Bennett et al. |
| 9,385,601 B2 | 7/2016 | Nguyen et al. |
| 9,960,680 B1 | 5/2018 | Miyamae |
| 10,170,997 B2 | 1/2019 | Asahi |

(Continued)

OTHER PUBLICATIONS

"ADP2442: 36 V,1 A, Synchronous, Step-Down, DC-to-DC Regulator with External Clock Synchronization", Analog Devices Data Sheet, (2015), 37 pgs.

(Continued)

*Primary Examiner* — Nguyen Tran
(74) *Attorney, Agent, or Firm* — Schwegman Lundberg & Woessner, P.A.

(57) ABSTRACT

A switching converter circuit comprises a converting circuit stage, an error amplifier, and a control circuit. The converting circuit stage includes a magnetic circuit element and a switching circuit configured to convert an input voltage to a regulated output voltage by charging and discharging the magnetic circuit element using activation pulses generated using a system clock signal. The error amplifier generates a control voltage using the output voltage. The control circuit varies time between successive activation pulses according to the control voltage, and the successive activation pulses are synchronized to the system clock signal.

18 Claims, 8 Drawing Sheets

(56) References Cited

U.S. PATENT DOCUMENTS

| | | |
|---|---|---|
| 10,222,814 B1 | 3/2019 | Chakraborty et al. |
| 10,560,013 B2 | 2/2020 | Tirumala et al. |
| 10,892,684 B2 | 1/2021 | Wachi et al. |
| 10,944,323 B2 | 3/2021 | Nam |
| 11,056,976 B2 | 7/2021 | Lu et al. |
| 2004/0174152 A1 | 9/2004 | Hwang et al. |
| 2009/0189578 A1 | 7/2009 | Chen et al. |
| 2009/0237051 A1* | 9/2009 | Saitoh .............. H02M 3/156 323/282 |
| 2012/0038341 A1* | 2/2012 | Michishita ......... H02M 3/158 323/284 |
| 2018/0152103 A1* | 5/2018 | Mansri ............... H02M 3/157 |
| 2020/0403511 A1 | 12/2020 | Hashiguchi |

OTHER PUBLICATIONS

"LTC1871-7: High Input Voltage, Current Mode Boost, Flyback and SEPIC Controller", Linear Technology Data Sheet, (2002), 34 pgs.

* cited by examiner

LOW RIPPLE PULSE-SKIP MODE CONTROL IN SWITCHING MODE POWER SUPPLIES

BACKGROUND

Electronic systems can include devices that require a regulated power source. Power circuits can be used to provide a circuit supply rail having a regulated voltage. Some power circuits are switching converter circuits. Switching converter circuits can operate in a continuous conduction mode or in a discontinuous conduction mode when in a light load condition.

SUMMARY OF THE DISCLOSURE

This document relates generally to switching power converters and methods of their operation. An example of a switching converter circuit includes a converting circuit stage, an error amplifier, and a control circuit. The converting circuit stage includes a magnetic circuit element and a switching circuit configured to convert an input voltage to a regulated output voltage by charging and discharging the magnetic circuit element using activation pulses generated using a system clock signal. The error amplifier generates a control voltage using the output voltage. The control circuit varies time between successive activation pulses according to the control voltage, and the successive activation pulses are synchronized to the system clock signal.

An example of a method of operating a switching converter circuit includes charging and discharging a magnetic circuit element by providing activation pulses generated using a system clock signal to a switching circuit to produce an output voltage of the switching mode supply circuit, generating a control voltage using the output voltage, and varying time between successive activation pulses according to the control voltage, wherein provided activation pulses are synchronized to the system clock signal.

An example of a DC-DC converter circuit includes a converting circuit stage, an error amplifier, and a control circuit. The converting circuit stage includes a magnetic circuit element and a switching circuit that converts an input voltage to a regulated output voltage by charging and discharging the magnetic circuit element using activation pulses generated using a system clock signal. The error amplifier generates a control voltage using the output voltage. The control circuit includes a converter circuit to convert the control voltage to a control current, a threshold circuit configured to generate a time varying current threshold, a comparison circuit node to receive the control current and the time varying current threshold, and logic circuitry configured to enable the activation pulses according to the comparison circuit node so that the successive activation pulses are synchronized to the system clock signal.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views, Like numerals having different letter suffixes may represent different instances of similar components. The drawings illustrate generally, by way of example, but not by way of limitation, various embodiments discussed in the present document.

DETAILED DESCRIPTION

Power circuits may need to provide a fixed or stable output voltage as an electrical circuit supply for an electronic system. Some power circuits are switching converter circuits that convert the input voltage to a regulated output voltage. The regulation is typically achieved by recurrently charging a magnetic circuit element, such as an inductor, from an energy source and then discharging the energy of the magnetic circuit element to drive a load. The charging and discharging can be accomplished using electronic switches that include transistors.

The regulated voltage conversion can provide a regulated output voltage that is higher than the input voltage of the regulator (a boost converter), lower than the input voltage (a buck converter), either higher or lower than the input voltage (a buck-boost converter), or inverted from the input voltage (an inverter). In other examples, the magnetic circuit element is a transformer, and the switching converter circuit can be a flyback converter or a forward converter.

It can be useful to monitor the current in the inductor or transformer. This monitoring can be used for closed loop control such as current mode control of pulse width modulation (PWM), and for fault protection such as overcurrent protection, and load current limiting. In peak current mode control, the control transistor is turned on by the system clock and the current in the inductor or transformer linearly ramps up when the control transistor is turned on. When the current sensing signal ramps up to the specified peak current threshold, the control transistor is turned off and stays turned off until the next turn on time.

A switching converter circuit can operate in a continuous conduction mode (CCM) in which there is always some current flowing in or out of the inductor or transformer, or in a discontinuous conduction mode (DCM) in which the there is no current flowing at certain phases of charging or discharging.

For light load conditions, a direct current to direct current (DC-DC) switching mode power supply (SMPS) can operate in either CCM or DCM. DCM operation has the benefit of reduced conduction loss therefore higher power efficiency. However, there is a minimum on-time limit of the power switch due to circuit delays and comparator blanking time. Because of the minimum on-time limit, the SMPS cannot operate in DCM below a certain power level without utilizing a special control method.

One type of DCM control method shuts down the switching of the SMPS during certain switching cycles in light load conditions to conserve energy. When certain conditions are met the SMPS returns to switching operation. One type of operation of this type is pulse-skip mode or burst mode.

Figure 1:
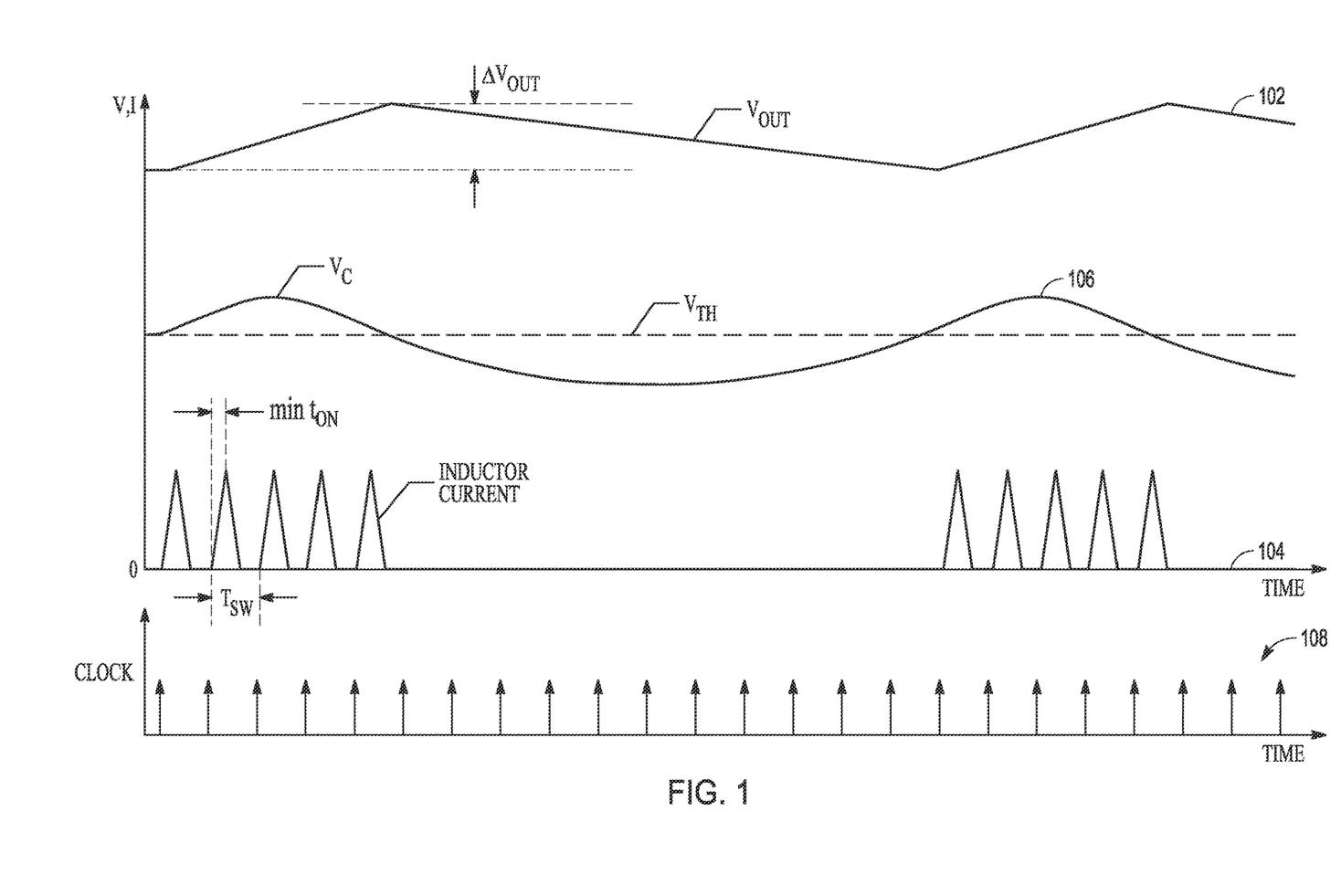
FIG. 1 is an illustration of waveforms associated with pulse-skip mode control of a switching mode power supply.
Figure 2:
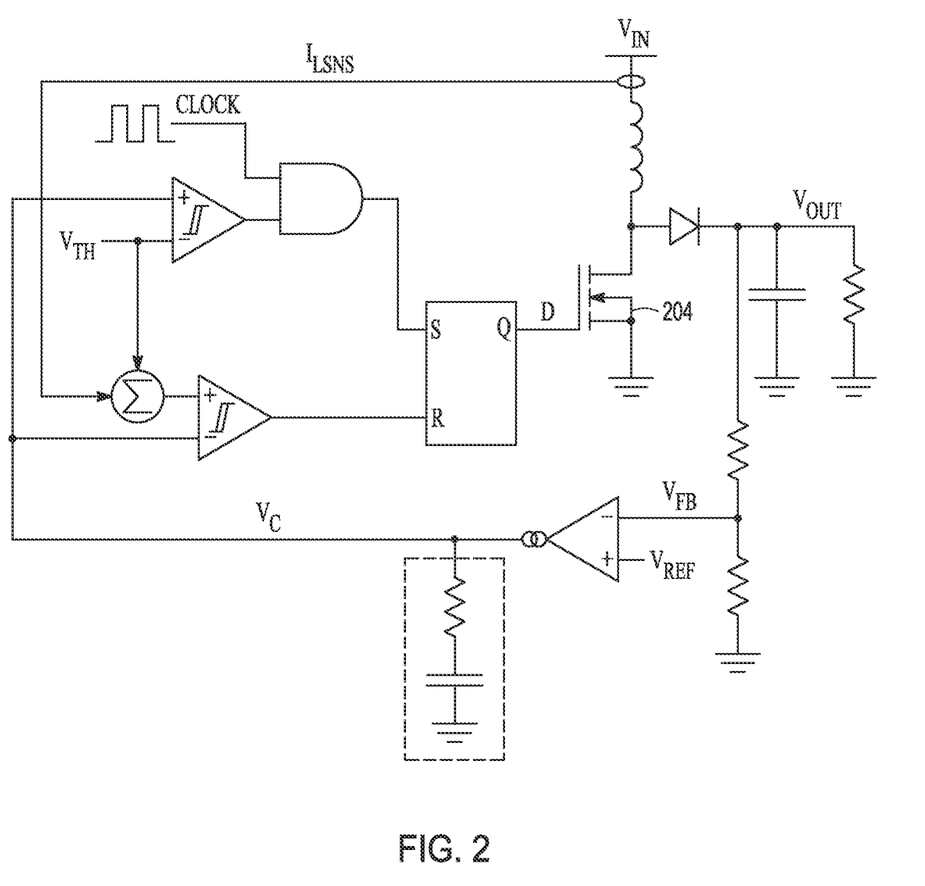
FIG. 2 is a circuit diagram of an example of a switching converter circuit that uses pulse-skip mode control

FIG. 1 is an illustration of waveforms associated with pulse-skip mode control in a current-mode controlled SMPS that uses an inductor as the magnetic circuit element. The top waveform 102 is the output voltage waveform $V_{OUT}$ of the SMPS. The bottom waveform 104 shows the inductor current. The output voltage is regulated using control voltage $V_C$ shown in the middle waveform 106. The control voltage $V_C$ can be produced using an error amplifier that compares $V_{OUT}$ to a target voltage. Below the waveforms is shown a clock signal 108. The clock signal can be generated internally or synchronized from an external clock signal, FIG. 2 is a circuit diagram of an example of a switching converter circuit to implement pulse-skip mode control. At the start of each clock cycle, if the control voltage $V_C$ is greater than a threshold voltage $V_{TH}$ ($V_C>V_{TH}$), the clock will turn on the electronic switch 204. At heavy load, the switch 204 turns off when the inductor current is greater than $V_C-V_{TH}$. At light load, as $V_C$ goes lower and lower (while $V_C-V_{TH}>0$ still holds), the inductor current may exceed $V_C-V_{TH}$ immediately as the switch 204 turns on. In this case the switch 204 will not turn off until a minimum on-time expires. Therefore, at light load DCM, the peak inductor current is no longer controlled by $V_C$. To regulate the output voltage, a separate control mechanism (pulse-skipping) is required, where if $V_C<V_{TH}$, no switching will occur at the start of the clock cycle.

However, as shown in FIG. 1, in pulse-skip mode control, multiple switching cycles occur in a group together as a burst of switching cycles. This is because the bandwidth of the voltage control is much slower than the frequency of the switching to energize the inductor. This grouping of multiple switching cycles can cause ripple in the output voltage (shown as $\Delta V_{OUT}$ in the waveform 102).

Figure 3:
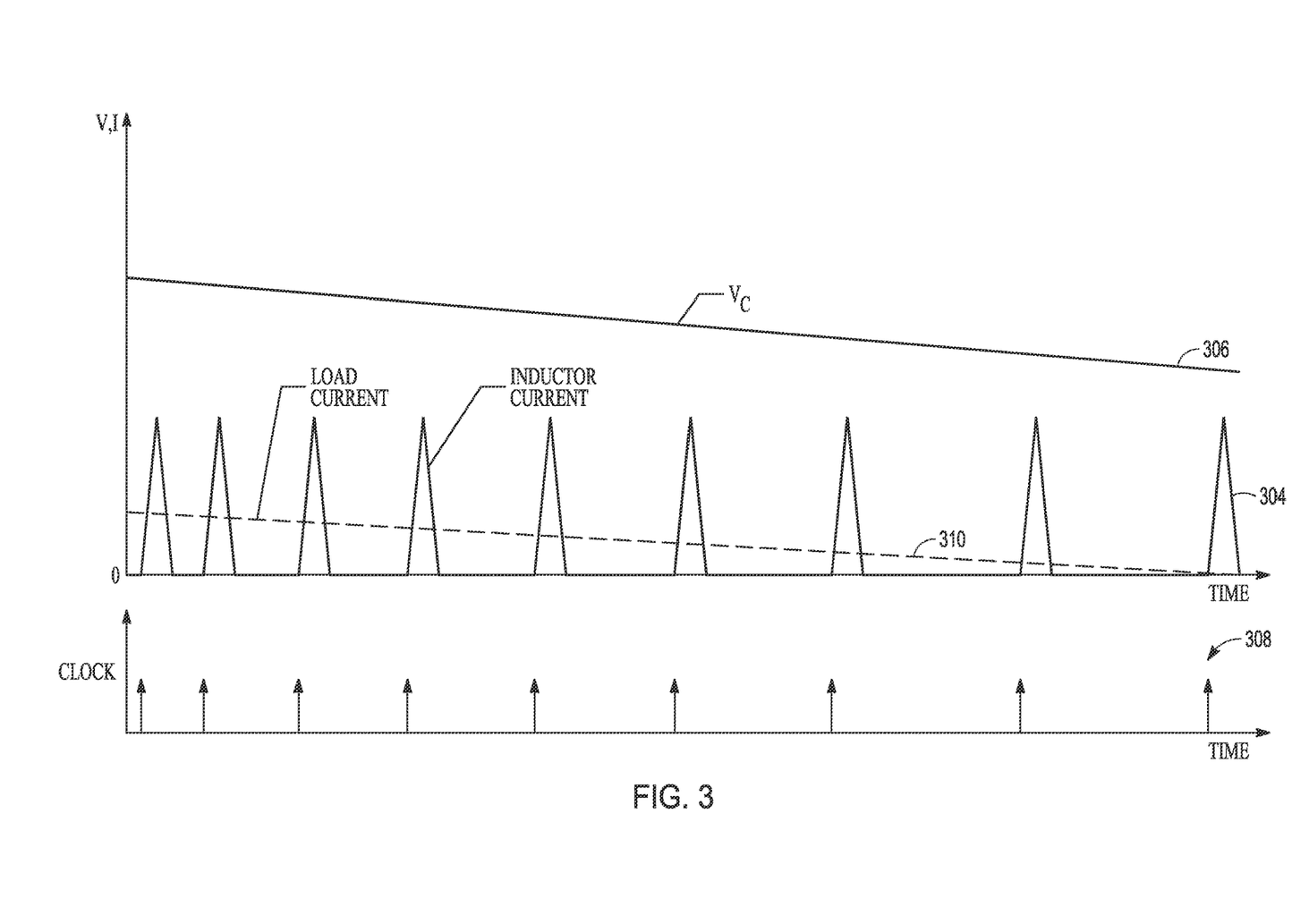
FIG. 3 is an illustration of waveforms associated with low-ripple burst mode control of a switching mode power supply.

FIG. 3 is an illustration of waveforms associated with another type of SMPS operation called low-ripple burst mode control. The control voltage $V_C$ 306, inductor current 304, and clock signal 308 are shown. Load current 310 is also shown. In the low-ripple burst mode method, the SMPS operates at a fixed peak current level under light load. The clock signal 308 is stretched or slowed according to the control voltage $V_C$, to regulate the output voltage $V_{OUT}$ (not shown). As the load demand goes lower, $V_C$ gets smaller, and the switching frequency goes lower as well.

As illustrated in FIG. 3, in this method of operation a "sleep" period occurs after every switching cycle, which eliminates the pulse grouping of the example in FIG. 1. This results in lower voltage ripple in the output voltage and also results in reduced switching loss because the switching frequency is decreased during the light load condition. However, because the clock signal 308 changes with load conditions, the switching events are not synchronized to the external clock source. In some applications, the synchronization of the switching with the system-level clock is desired to avoid interference to sensitive circuits or to further minimize ripples in voltage and current.

Figure 4:
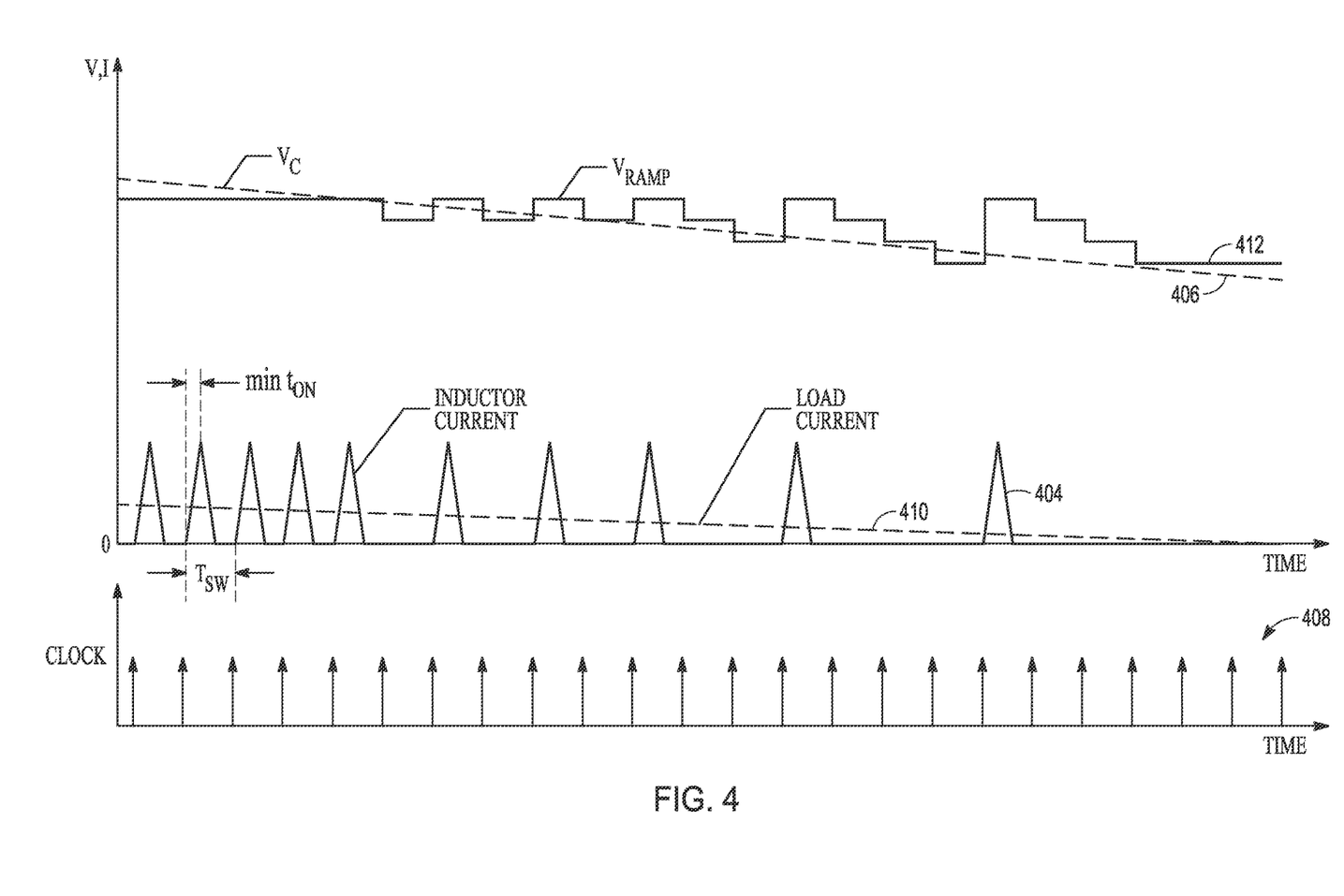
FIG. 4 is an illustration of waveforms associated with low-ripple pulse-skip mode control of a switching mode power supply.

FIG. 4 is an illustration of waveforms associated with a type of SMPS operation that can be referred to as low-ripple pulse-skip mode control. The control voltage $V_C$ 406, inductor current 404, load current 410, and clock signal 408 are shown. The control voltage $V_C$ is used to regulate the output of the SMPS. In light load conditions, $V_C$ decreases until the duty cycle of the SMPS is limited by the minimum on time of the control switch. When $V_C$ becomes lower than a time varying threshold signal 412 the SMPS will stop switching and skip pulses. In contrast to the pulse-skip mode of the example in FIG. 1, the frequency of the switching changes with load condition and the activation pulses do not occur as a burst of multiple pulses under light load conditions. Instead, the time between successive pulses changes with the load. In contrast to the low-ripple burst mode of the example in FIG. 3, the switching is synchronized to the system clock.

Figure 5:
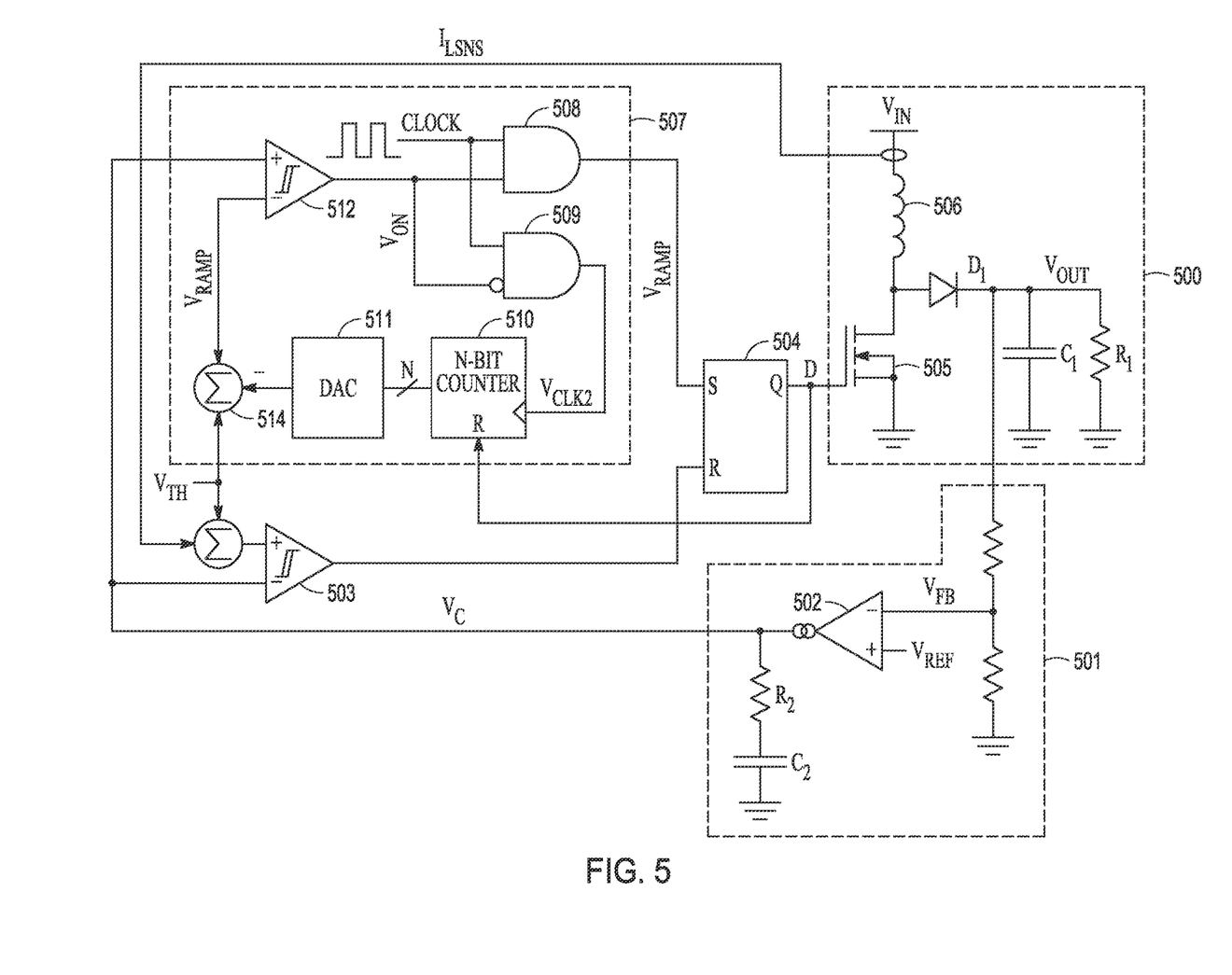
FIG. 5 is a circuit diagram of an example of a switching converter circuit that uses low-ripple pulse-skip mode control.

FIG. 5 is a circuit diagram of an example of a current-mode boost switching converter circuit to implement low-ripple pulse-skip mode control. The example is a non-synchronous boost power converter, although the converter may be a synchronous converter and may have another SMPS topology (e.g., a buck switching converter, a buck-boost switching converter etc.).

The circuit includes a converting circuit stage 500. The converting circuit stage 500 includes a switching circuit 505 that charges an inductor 506 as the magnetic circuit element and a diode $D_1$ that discharges the inductor 506. The inductor 506 may be a discrete inductor or an inductor fabricated as part of an integrated circuit (IC). The switching circuit 505 and diode $D_1$ may be discrete components or part of an IC. The converting circuit stage 500 also includes a capacitor $C_1$. The resistor $R_1$ represents the circuit load. The switching circuit 505 can be a field effect transistor (FET), a bipolar-junction transistor (BJT), an insulated-gate bipolar transistor (IGBT), or another type of electronic switch. The diode $D_1$ can also be an electronic switch in a synchronous converter. The converting circuit stage 500 converts an input voltage $V_{IN}$ to a regulated output voltage $V_{OUT}$ by charging and discharging the inductor 506 by activating and deactivating the switching circuit 505 using activation pulses. The activation pulses are generated using a system clock signal (clock) or a clock signal synchronized to the system clock signal.

The switching converter circuit includes a voltage control loop 501. Error amplifier 502 generates a control voltage using the output voltage. In the example of FIG. 5, the output of the error amplifier 502 is a current. The current output from the error amplifier is converted to a control voltage $V_C$ using resistor $R_2$ and capacitor $C_2$. The control voltage $V_C$ is used to regulate the output voltage $V_{OUT}$ so that the feedback voltage $V_{FB}$ equals the reference voltage $V_{REF}$.

The switching converter circuit also includes a current control loop that includes a current sensing circuit 516, a peak current comparator circuit 503 and a Set-Reset latch 504. The Set-Reset latch 504 will set its output D high at the beginning of each clock cycle to turn on the switching circuit 505 in the converting circuit stage 500. Turning on the switching circuit 505 energizes or charges the inductor. The inductor current is sensed and a voltage signal representative of the inductor current is generated and a threshold voltage $V_{TH}$ is added to the voltage signal. The Set-Reset Latch 504 turns on the switching circuit 505 until the peak current comparator circuit 503 detects that the voltage signal representative of sensed inductor current plus $V_{TH}$ is greater than the control voltage $V_C$. After the detection, the current comparator circuit 503 resets the Set-Reset latch 504 to turn off or disable the switching circuit 505, to de-energize or discharge the inductor and transfer the energy to the output. Control voltage $V_C$ essentially controls the peak of the inductor current; and the voltage loop 501 controls $V_C$ to regulate $V_{OUT}$. For simplicity, the slope compensation circuit is omitted from FIG. 5, where in practice an extra ramp signal can be used to eliminate potential sub-harmonic oscillation.

The switch converter circuit also includes a control circuit 507 that implements low-ripple pulse-skip control. The control circuit 507 varies the time between successive activation pulses according to the control voltage $V_C$, however the successive activation pulses are still synchronized to the system clock signal even though the time between successive pulses changes.

The control circuit 507 includes a comparator circuit 512. The comparator circuit 512 compares $V_C$ to a time varying threshold signal. In the example of FIG. 5, the time varying threshold signal is a decreasing ramp voltage such as time varying threshold signal 412 or $V_{RAMP}$ in FIG. 4. The control circuit 507 includes a ramp circuit to generate the decreasing ramp voltage. The comparator circuit 512 can be viewed as a pulse-skip comparator that disables sending activation pulses to the switching circuit 505 when $V_C$ is less than the threshold signal and enables the activation pulses when $V_C$ is greater than the threshold signal. The output of the comparator circuit 512 is provided to logic circuitry 508 and 509. The logic circuitry provides a gated clock signal $V_{CLK1}$ to the Set-Reset latch 504 when the output of the comparator circuit 512 $V_{ON}$ is high. When the output of the comparator circuit 512 $V_{ON}$ is low, the logic circuitry sends a gated clock signal $V_{CLK2}$ to the ramp circuit.

The ramp circuit includes a bit counter circuit 510 and a digital-to-analog converter (DAC) circuit 511, The bit counter circuit 510 implements an N-bit counter, where N is a positive integer. To produce the ramp signal, the bit counter circuit 510 outputs a count that is provided to the DAC circuit 511 and the DAC circuit 511 outputs an analog signal based on the count. The decreasing ramp signal $V_{RAMP}$ is produced by the DAC output being subtracted from the threshold voltage $V_{TH}$. The count is restarted to restart the ramping when an activation pulse is provided to the switching circuit 505.

During the skipped cycles, the output of the comparator 512 $V_{ON}$ is low because $V_C$ is less than the threshold signal. Because $V_{ON}$ is low, the logic circuitry provides $V_{CLK2}$ to cause the bit counter circuit 510 to count upward every clock cycle. The bit count is output to the DAC circuit 511 that with the summing circuit 514 imposes a digitized ramping signal on $V_{RAMP}$. $V_{RAMP}$ ramps down with an interval from $V_{TH}$ to $V_{TH}-(2^N-1)(LSB)$, where LSB (Least Significant Bit) is the smallest step size of the DAC circuit 511. When $V_C$ stays within the interval, it creates a self-oscillatory state. The self-oscillatory state forces the system to alternate between switching and skipping states, and evenly distributes the switching and skipping events according to the level of $V_C$. FIG. 4 shows an example of operation of the circuit of FIG. 5 with N=2, or the bit-counter circuit 510 implements a 2-bit counter.

When the control voltage is greater than the threshold voltage or $V_C>V_{TH}$, the switching converter circuit will continuously switch with minimum on-time, on average delivering minimum power $P_{MIN}$. In a boost converter, $$P_{MIN}=V_{IN}^2 * f * t_{ON,MIN}^2 * M/(2L(M-1)),$$

where L is the inductance of the inductor 506, f is the switching frequency, $t_{ON,MIN}$ is the minimum on time, and $M=V_{OUT}/V_{IN}$. When the control voltage $V_C$ is in the interval $V_{TH}>V_C>V_{TH}-LSB$, the switching converter circuit will follow a one-switch-one-skip pattern, on average delivering 50% of the minimum power $P_{MIN}$. When the control voltage $V_C$ is in the interval $(V_{TH}-LSB)>V_C>V_{TH}-2(LSB)$, it will follow one-switch-two-skip pattern, delivering 33% $P_{MIN}$. When $V_C<V_{TH}-(2^N-1)*LSB$, the switching converter circuit completely stops switching and delivers zero power 0% of $P_{MIN}$. When the demanded load power is between these discrete power levels, $V_C$ is required to move up and down to produce the demanded average power, which is an expected phenomenon if the switching is synchronized to clock. However, because the pulses are already separated, the resulting output voltage ripple is much reduced. What is more, when the equivalent switching frequency is sufficiently low, the bandwidth of $V_C$ should be fast enough to follow the change in the equivalent switching frequency.

When the circuit load increases, $V_C$ will go higher. As soon as $V_C>V_{TH}$, the system goes back to continuous switching, and $V_C$ limits the peak inductor current. The switching converter circuit transitions between peak-current mode control and low-ripple pulse-skip mode control seamlessly. With the low-ripple Pulse-Skip control shown in FIG. 4, the switching pulses are not grouped together in a burst, therefore the output voltage ripple is greatly suppressed. Because it switches using minimum on-time, the inductor current ripple is minimized as well. Therefore, the voltage ripple reduction of low-ripple pulse-skip control is superior to both of the control modes in FIGS. 1 and 3 while the switching event is always synchronized to the clock, enabling system-level optimization with avoidance of noise interference. The decreased switching frequency will also reduce switching loss, improving power efficiency at light load conditions.

Figure 6:
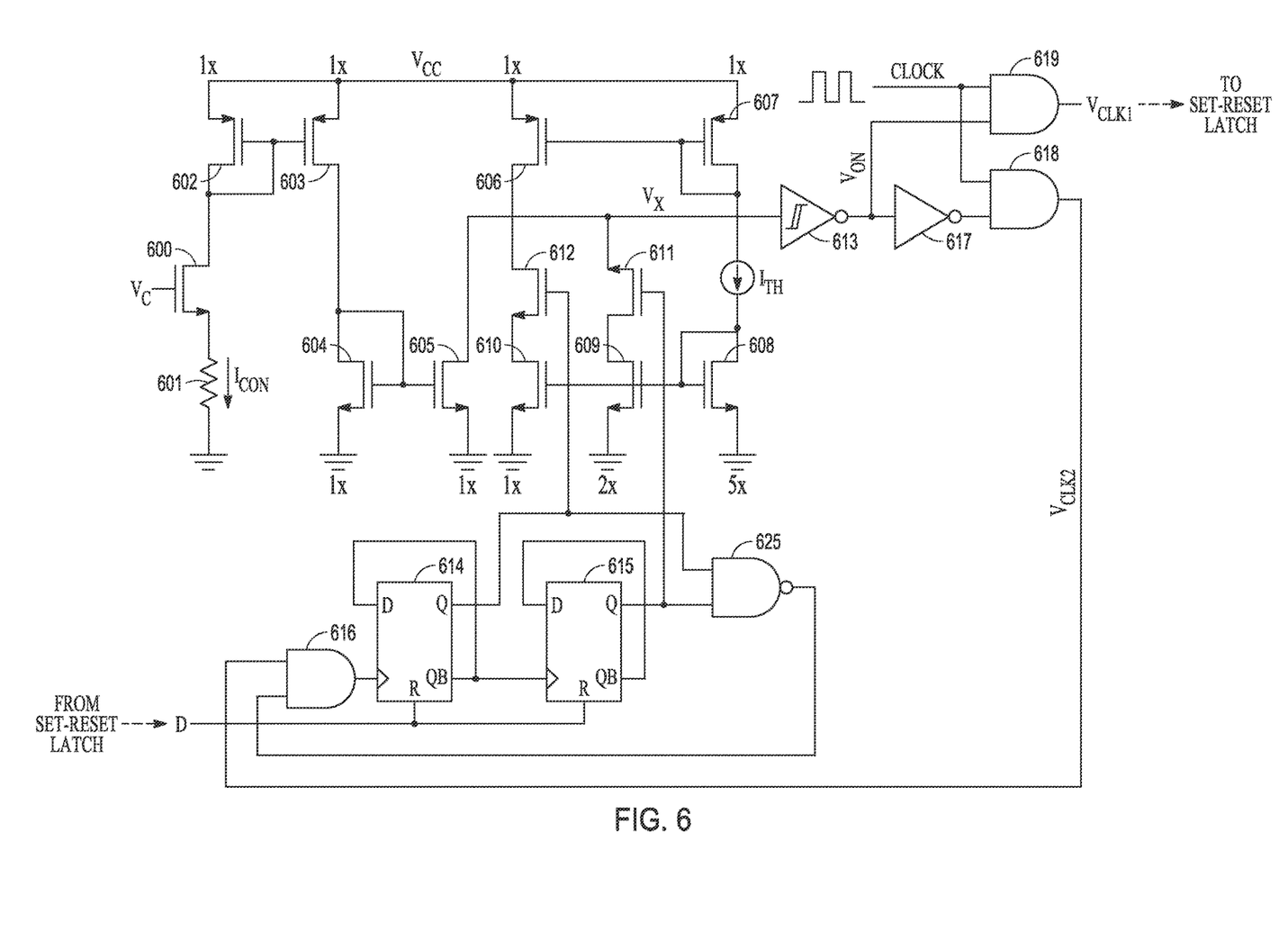
FIG. 6 is a circuit diagram of an example detailed realization of pulse-skip mode control.

FIG. 6 is a circuit diagram of another example of a control circuit to implement low-ripple pulse-skip mode control. The Set-Reset latch, the converting circuit stage, and the error amplifier are not shown. In the example of FIG. 6, the pulse-skip comparator circuit 512 of FIG. 5 is implemented in the current domain instead of the voltage domain. The NMOS transistor 600 converts control voltage $V_C$ to a control current $I_{CON}$, $$I_{CON}=(V_C-V_{THN})/R,$$

where $V_{THN}$ is the threshold voltage of NMOS transistor 600, and R is the resistance of the degeneration resistor 601. $I_{CON}$ is duplicated by 1× current mirrors 602, 603, and 604, 605, to inject the control current $I_{CON}$ into the comparison node $V_X$.

Instead of comparing a control voltage $V_C$ to a threshold voltage VIE, the control current $I_{CON}$ is compared to a threshold current $I_{TH}$. The threshold current $I_{TH}$ is duplicated by current mirrors 606 and 607 to inject $I_{TH}$ into the comparison node $V_X$. The control circuit includes a 2-bit DAC that consists of bit-weighted current mirrors 608, 609, 610, and switch transistors 611, 612. The output of the DAC produces a current that varies with time. For the 2-bit DAC, 1 LSB of the DAC equals 20% of $I_{TH}$ according to the ratio of the current mirrors, although this choice is arbitrary and other percentages could have been chosen. The DAC is driven by a 2-bit counter, which is implemented as D-flip-flops 614 and 615. The logic gates 616 and 625 stop the 2-bit counter when it reaches the maximum of binary 11. The 2-bit counter is reset by the switching signal D, which is the output of the Set-Reset latch. The inverter 613 inverts the comparison node $V_X$ to the signal $V_{ON}$. When $V_X$ is low and $V_{ON}$ is high, AND gate 619 sends the clock signal as $V_{CLK1}$ to the Set-Reset latch and the converting circuit stage of the SMPS switches in the normal state. When $V_{ON}$ is low, AND gate 619 sets $V_{CLK1}$ low and the converting circuit stage stops switching. The logic gates 617 and 618 send the clock signal as $V_{CLK2}$ to activate the 2-bit counter.

In a non-limiting example, with $I_{TH}$ equal to 5 microamps ($I_{TH}$=5 μA) and degeneration resistor 601 equal to 10 kilo-ohms (R=10 kΩ), one LSB of the counter and DAC is 1 μA. When the control current is greater than the threshold current ($I_{CON}$≥5 μA) (or $V_C$-$V_{THN}$≥50 millivolts (50 mV)), the switching converter circuit switches continuously in peak-current control mode. When 5 μA>$I_{CON}$>2 μA (or 50 mV>20 mV), the switching converter circuit alternates between switching and skipping cycles, and when $I_{CON}$<2 μA(or $V_C$-$V_{THN}$<20 mV), the switching converter circuit completely stops switching.

Figure 7:
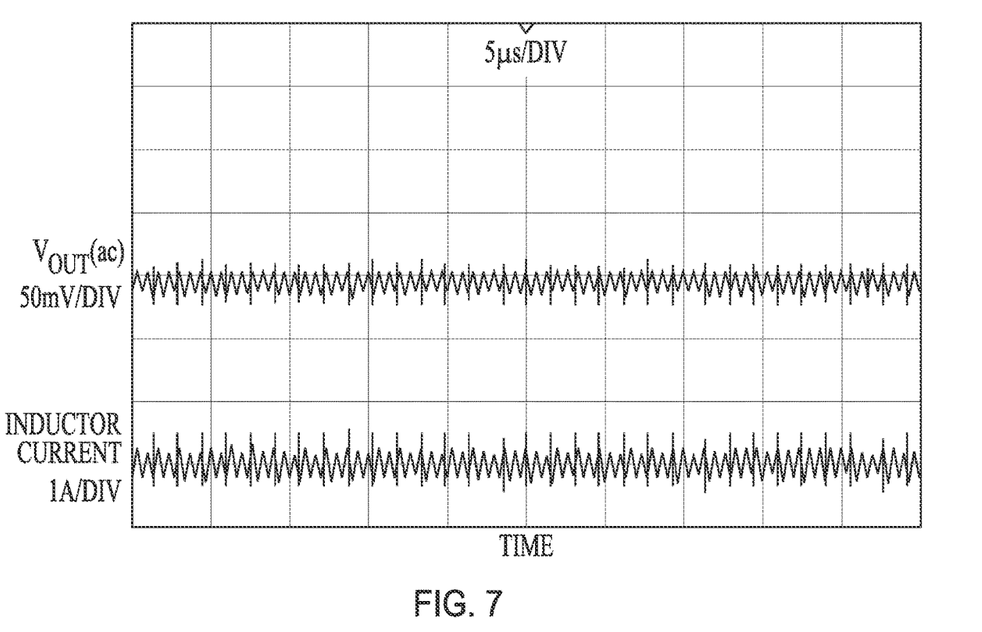
FIG. 7 is graph of measured waveforms of an implementation of the circuit of FIG. 6.

FIG. 7 is a graph showing measured waveforms of the circuit of FIG. 6, with the switching converter circuit operating at $V_{IN}$=14V, $V_{OUT}$=28V, and an inductor with inductance of 1.5 micro-Henrys (L=1.5 μH). The minimum on-time is about 50 nanoseconds (50 ns). The frequency of the clock signal is 2 MHz. The waveforms were measured at a load current less than 100 μA. The circuit switches at either 1.5 μs period or 2 μs period, and the output voltage ripple is less than 20 mV.

Figure 8:
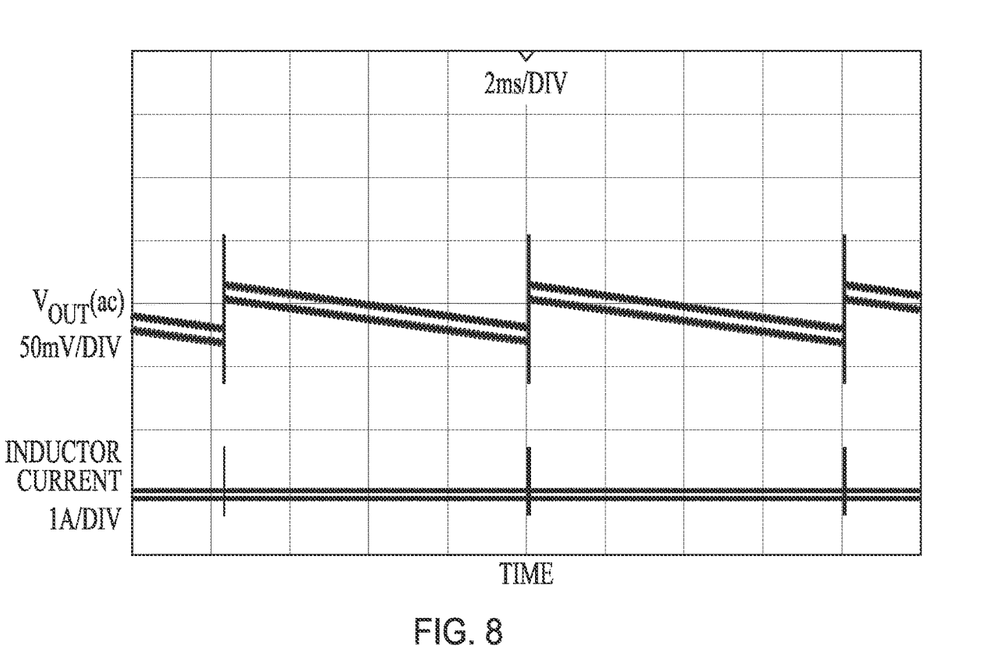
FIG. 8 is graph a measured waveforms of circuit that uses pulse-skip mode control.

FIG. 8 shows the measured waveforms of a circuit implementing the pulse-skip mode of FIG. 1 under the same conditions. The waveforms show that the grouped switching pulses result in a much larger output voltage ripple. At steady state, the low-ripple pulse-skip control mode of FIG. 7 will end up with an almost stable switching pattern, where the equivalent switching period is multiples of the clock period. In the frequency domain it will be almost a single tone at a fraction of the clock frequency. In contrast, the pulse-skip scheme of FIG. 8 does not end up with a stable switching pattern. Frequency spectrum wise, it will have some content at the clock frequency, while also having a 'beat' at a much lower frequency.

Figure 9:
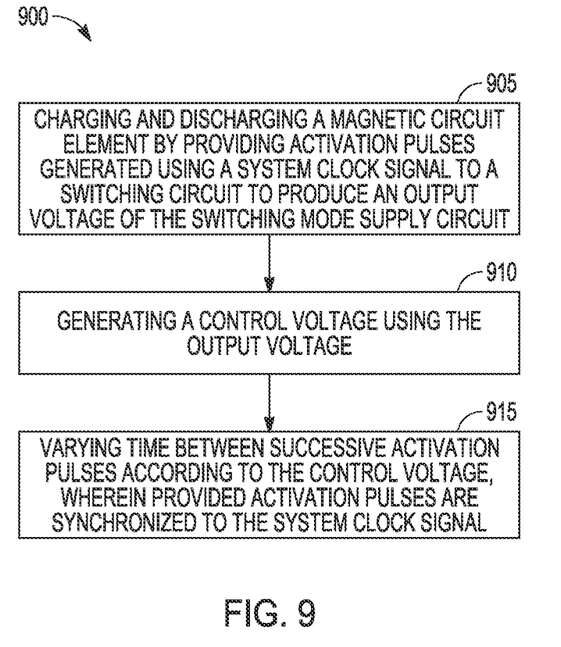
FIG. 9 is a flow diagram of an example of a method of operating a switching converter circuit.

As an overview, FIG. 9 is a flow diagram of a method 900 of operating a switching converter circuit. At block 905, a magnetic circuit element is charged and discharged by providing activation pulses generated using a system clock signal to a switching circuit to produce an output voltage of the switching mode supply circuit. In some examples, the output voltage $V_{OUT}$ is greater than the input voltage $V_{IN}$ and in some examples, the output voltage is less that the input voltage. The magnetic circuit element may be an inductor or a transformer.

At block 910, a control voltage is generated using the output voltage. The control voltage may be generated by comparing the output voltage to a target voltage. At block 915, the time between successive activation pulses is varied according to the control voltage. The provided activation pulses are synchronized to the system clock signal. In some examples, the control voltage is compared to a time varying threshold voltage to determine whether an activation pulse should be provided to the switching circuit. In some examples, the control voltage is converted to a control current, and the control current is compared to a time-varying threshold current to determine whether an activation pulse should be provided to the switching circuit. Either the time varying voltage threshold or the time varying current threshold may be a decreasing ramp voltage or current signal. The time between successive activation pulses varies according to how long the control voltage or control current is less than the voltage threshold or current threshold.

The several examples of systems, devices, and methods described provide switching converter circuit with reduced output ripple than conventional circuits.

ADDITIONAL DESCRIPTION AND ASPECTS

A first Aspect (Aspect 1) includes subject matter (such as a switching converter circuit) comprising a converting circuit stage, an error amplifier, and a control circuit. The converting circuit stage includes a magnetic circuit element and a switching circuit configured to convert an input voltage to a regulated output voltage by charging and discharging the magnetic circuit element using activation pulses generated using a system clock signal. The error amplifier generates a control voltage using the output voltage. The control circuit varies time between successive activation pulses according to the control voltage, and the successive activation pulses are synchronized to the system clock signal.

In Aspect 2, the subject matter of Aspect 1 optionally includes a control circuit that includes a comparator circuit configured to enable an activation pulse to the switching circuit according to a comparison of the control voltage to a time-varying threshold signal.

In Aspect 3, the subject matter of one or both of Aspects 1 and 2 optionally includes a ramp circuit configured to generate a decreasing ramp voltage signal, and a comparator circuit configured to disable an activation pulse to the switching circuit when the control voltage is less than the decreasing ramp voltage and enable the activation pulse to the switching circuit when the control voltage is greater than the decreasing ramp voltage.

In Aspect 4, the subject matter of Aspect 3 optionally includes a bit counter circuit that outputs a count that is restarted when the activation pulse is provided to the switching circuit, and a digital-to-analog converter (DAC) circuit that generates the decreasing ramp voltage signal using the count of the bit counter circuit.

In Aspect 5, the subject matter of one or any combination of Aspects 1-4 optionally includes a control circuit that includes a current sensing circuit configured to generate a signal representative of current of the magnetic circuit element, and a current comparator circuit configured to disable the activation pulses to the switching circuit when the signal representative of current is greater than the control voltage.

In Aspect 6, the subject matter of one or any combination of Aspects 1-5 optionally includes a control circuit configured to convert the control voltage to a control current and generate a time-varying current threshold, and a comparator circuit that enables an activation pulse to the switching circuit according to a comparison of the control current to the time-varying current threshold.

In Aspect 7, the subject matter of one or any combination of Aspects 1-6 optionally includes a converting circuit stage that is configured to convert the input voltage to a regulated output voltage greater than the input voltage.

In Aspect 8, the subject matter of one or any combination of Aspects 1-7 optionally includes a converting circuit stage that is configured to convert the input voltage to a regulated output voltage less than the input voltage.

Aspect 9 includes subject matter (such as a method of operating a switching mode supply circuit) or can optionally be combined with one or any combination of Aspects 1-8 to include such subject matter, comprising charging and discharging a magnetic circuit element by providing activation pulses generated using a system clock signal to a switching circuit to produce an output voltage of the switching mode supply circuit, generating a control voltage using the output voltage, and varying time between successive activation pulses according to the control voltage, wherein provided activation pulses are synchronized to the system clock signal.

In Aspect 10, the subject matter of Aspect 9 optionally includes generating a time-varying threshold, and providing an activation pulse to the switching circuit according to a comparison of the control voltage to the time-varying threshold.

In Aspect 11, the subject matter of one or both of Aspects 9 and 10 optionally includes generating a decreasing ramp voltage signal that decreases from a predetermined voltage level, and providing an activation pulse to the switching circuit when the control voltage is greater than the decreasing ramp voltage signal and omitting the activation pulse when the control voltage is less than the decreasing ramp voltage signal.

In Aspect 12, the subject matter of Aspect 11 optionally includes restarting a bit counter when the activation pulse is provided to the switching circuit, and providing a count of the bit counter to a digital-to-analog converter (DAC) circuit to generate the decreasing ramp voltage signal.

In Aspect 13, the subject matter of Aspect 12 optionally includes varying the time between activation pulses according to the count of the bit counter, and synchronizing the count and the activation pulses to the system clock.

In Aspect 14, the subject matter of one or any combination of Aspects 9-13 optionally includes monitoring current of the magnetic circuit element using a current sensing circuit, and enabling the providing activation pulses to the switching circuit when the current is less than a predetermined current threshold.

In Aspect 15, the subject matter of one or any combination of Aspects 9-14 optionally includes generating a control current using the control voltage, generating a time-varying current threshold, and providing an activation pulse to the switching circuit according to a comparison of the control current to the time-varying current threshold.

In Aspect 16, the subject matter of one or any combination of Aspects 9-15 optionally includes charging and discharging the magnetic circuit element using an input voltage less than the output voltage.

In Aspect 17, the subject matter of one or any combination of Aspects 9-16 optionally includes charging and discharging the magnetic circuit element using an input voltage greater than the output voltage.

Aspect 18 includes subject matter (such as a DC-DC converter circuit) or can optionally be combined with one or any combination of Aspects 1-17 to include such subject matter, comprising aa converting circuit stage, an error amplifier, and a control circuit. The converting circuit stage includes a magnetic circuit element and a switching circuit that converts an input voltage to a regulated output voltage by charging and discharging the magnetic circuit element using activation pulses generated using a system clock signal. The error amplifier generates a control voltage using the output voltage. The control circuit includes a converter circuit to convert the control voltage to a control current, a threshold circuit configured to generate a time varying current threshold, a comparison circuit node to receive the control current and the time varying current threshold, and logic circuitry configured to enable the activation pulses according to the comparison circuit node so that the successive activation pulses are synchronized to the system clock signal.

In Aspect 19, the subject matter of Aspect 18 optionally includes a threshold circuit that includes a bit counter circuit that outputs a count that is restarted when the activation pulse is provided to the switching circuit, and a DAC circuit including bit-weighted current mirror circuits configured generate a decreasing current threshold as the time varying current threshold using the count and apply the decreasing current threshold to the comparison circuit node.

In Aspect 20, the subject matter of Aspect 19 optionally includes a converter circuit that includes another current mirror circuit configured to apply the control current to the comparison circuit node.

These non-limiting Aspects can be combined in any permutation or combination. The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document; the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A switching converter circuit comprising:
   a converting circuit stage including:

a magnetic circuit element; and a switching circuit configured to convert an input voltage to a regulated output voltage by charging and discharging the magnetic circuit element using activation pulses generated using a system clock signal;

an error amplifier that generates a control voltage using the output voltage; and a control circuit that varies time between successive activation pulses according to the control voltage, wherein the successive activation pulses are synchronized to the system clock signal, and wherein the control circuit includes:

a ramp circuit configured to generate a decreasing ramp voltage signal; and a comparator circuit configured to vary the time between successive activation pulses according to a comparison of the control voltage to the decreasing ramp voltage signal, and wherein decreasing ramp voltage signal is reset by an activation pulse.

2. The switching converter circuit of claim 1, wherein the the comparator circuit is configured to disable an activation pulse to the switching circuit when the control voltage is less than the decreasing ramp voltage and enable the activation pulse to the switching circuit when the control voltage is greater than the decreasing ramp voltage.

3. The switching converter circuit of claim 2, wherein the ramp circuit includes:

a bit counter circuit that outputs a count that is restarted when the activation pulse is provided to the switching circuit; and a digital-to-analog converter (DAC) circuit that generates the decreasing ramp voltage signal using the count of the bit counter circuit.

4. The switching converter circuit of claim 1, wherein the control circuit includes:

a current sensing circuit configured to generate a signal representative of current of the magnetic circuit element; and a current comparator circuit configured to disable the activation pulses to the switching circuit when the signal representative of current is greater than the control voltage.

5. The switching converter circuit of claim 1, wherein the control circuit is configured to convert the control voltage to a control current and generate a time-varying current threshold; and wherein the control circuit includes a comparator circuit that enables an activation pulse to the switching circuit according to a comparison of the control current to the time-varying current threshold.

6. The switching converter circuit of claim 1, wherein the converting circuit stage is configured to convert the input voltage to a regulated output voltage greater than the input voltage.

7. The switching converter circuit of claim 1, wherein the converting circuit stage is configured to convert the input voltage to a regulated output voltage less than the input voltage.

8. A method of operating a switching mode supply circuit, the method comprising:

charging and discharging a magnetic circuit element by providing activation pulses generated using a system clock signal to a switching circuit to produce an output voltage of the switching mode supply circuit;

generating a control voltage using the output voltage;

generating a decreasing ramp voltage signal that decreases from a predetermined voltage level; and varying time between successive activation pulses according to a comparison of the control voltage to the decreasing ramp voltage signal, wherein provided activation pulses are synchronized to the system clock signal and wherein the decreasing ramp voltage signal is restarted by an activation pulse.

9. The method of claim 8, wherein the varying time between the successive activation pulses according to a comparison of the control voltage to the decreasing ramp voltage includes:

providing an activation pulse to the switching circuit when the control voltage is greater than the decreasing ramp voltage signal and omitting the activation pulse when the control voltage is less than the decreasing ramp voltage signal.

10. The method of claim 9, wherein the generating the decreasing ramp voltage signal includes:

restarting a bit counter when the activation pulse is provided to the switching circuit; and providing a count of the bit counter to a digital-to-analog converter (DAC) circuit to generate the decreasing ramp voltage signal.

11. The method of claim 10, including:

varying the time between activation pulses according to the count of the bit counter; and synchronizing the count and the activation pulses to the system clock.

12. The method of claim 8, including:

monitoring current of the magnetic circuit element using a current sensing circuit; and enabling the providing activation pulses to the switching circuit when the current is less than a predetermined current threshold.

13. The method of claim 8, including:

generating a control current using the control voltage;

generating a time-varying current threshold; and providing an activation pulse to the switching circuit according to a comparison of the control current to the time-varying current threshold.

14. The method of claim 8, wherein the charging and discharging the magnetic circuit element includes charging and discharging the magnetic circuit element using an input voltage less than the output voltage.

15. The method of claim 8, wherein the charging and discharging the magnetic circuit element includes charging and discharging the magnetic circuit element using an input voltage greater than the output voltage.

16. A direct-current to direct current (DC-DC) converter circuit comprising:

a converting circuit stage including:

an magnetic circuit element; and a switching circuit configured to convert an input voltage to a regulated output voltage by charging and discharging the magnetic circuit element using activation pulses generated using a system clock signal;

an error amplifier that generates a control voltage using the output voltage; and a control circuit including:

a converter circuit to convert the control voltage to a control current;

a threshold circuit configured to generate a time varying current threshold;

a comparison circuit node to receive the control current and the time varying current threshold; and logic circuitry configured to enable the activation pulses according to the comparison circuit node, wherein the successive activation pulses are synchronized to the system clock signal.

17. The DC-DC converter circuit of claim 16, wherein the threshold circuit includes:
   a bit counter circuit that outputs a count that is restarted when the activation pulse is provided to the switching circuit; and
   a digital-to-analog converter (DAC) circuit including bit-weighted current mirror circuits configured generate a decreasing current threshold as the time varying current threshold using the count and apply the decreasing current threshold to the comparison circuit node.

18. The DC-DC converter circuit of claim 17, wherein the converter circuit includes another current mirror circuit configured to apply the control current to the comparison circuit node.

* * * * *